US012040102B2

(12) United States Patent
Brown et al.

(10) Patent No.: US 12,040,102 B2
(45) Date of Patent: Jul. 16, 2024

(54) TECHNETIUM-99M GENERATOR FOR ENRICHED MOLYBDENUM

(71) Applicant: UCHICAGO ARGONNE, LLC, Chicago, IL (US)

(72) Inventors: Michael A. Brown, Chicago, IL (US); David J. Bettinardi, Chicago, IL (US); Peter Tkac, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 389 days.

(21) Appl. No.: 16/850,783

(22) Filed: Apr. 16, 2020

(65) Prior Publication Data

US 2021/0327602 A1 Oct. 21, 2021

(51) Int. Cl.
*G21G 1/00* (2006.01)
*H05H 6/00* (2006.01)

(52) U.S. Cl.
CPC ............... *G21G 1/001* (2013.01); *H05H 6/00* (2013.01); *G21G 2001/0042* (2013.01); *G21G 2001/0073* (2013.01)

(58) Field of Classification Search
CPC ........................................................ H05H 6/00
See application file for complete search history.

(56) References Cited

U.S. PATENT DOCUMENTS

2014/0029710 A1* 1/2014 Wilson .................. G21G 1/001
228/176

OTHER PUBLICATIONS

M. Gumiela et al. New precipitation method for isolation of 99mTc from irradiated 100Mo target, J Radioanal Nucl Chem, 310, 1061-1067. (Year: 2016).*
Sujat San et al. Process R&D for particle size control of Molybdenum oxide, ANL/NE-16/47. (Year: 2016).*
DE Wall et al. Production of Molybdenum-99 using Neutron Capture Method, PNNL-19895. (Year: 2011).*

* cited by examiner

*Primary Examiner* — Michael G. Hartley
*Assistant Examiner* — Jagadishwar R Samala
(74) *Attorney, Agent, or Firm* — CHERSKOV FLAYNIK & GURDA, LLC

(57) ABSTRACT

A method for separating a parent isotope from a daughter isotope is provided, the method comprising supplying irradiated target; dissolving the irradiated target; treating the dissolved irradiated target to a precipitation step to form a first solid phase of the parent isotope and a first liquid phase of the daughter isotope; filtering the first liquid phase of daughter isotope to create a first purified fraction of the daughter isotope to create a second solid phase of the parent isotope and a second liquid phase of the daughter isotope; and filtering the second liquid phase to create a second liquid fraction of the daughter isotope. The process can be repeated until the $^{99}$Mo is exhausted and the enriched target material $^{98}$Mo or $^{100}$Mo can be easily re-used.

13 Claims, 3 Drawing Sheets

TECHNETIUM-99M GENERATOR FOR ENRICHED MOLYBDENUM

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to the production of medical isotopes, and more specifically, this invention relates to a system and method for isolating daughter isotopes, such as $^{99m}$Tc from parent isotopes, such as molybdenum $^{99}$Mo.

2. Background of the Invention $^{99m}$Technetium is used in nearly 80 percent of all nuclear medicine procedures. For example, it is used to aid in the diagnosis of heart diseases, brain and bone disorders, and hard to detect cancers. This translates into approximately 40 million procedures every year worldwide. Because of its short six-hour half-life, $^{99m}$Tc is generally mass-produced from its longer-lived parent $^{99}$Mo by means of uranium fission. Such uranium-based protocols generate high specific activity (HSA) Mo feedstocks. HSA $^{99}$Mo in current generators (fission-made $^{99}$Mo) only requires a small alumina column, because the actual Mo concentration is low.

There is increasing interest in non-uranium-based $^{99}$Mo production. For example, low specific activity (LSA) $^{99}$Mo may be generated from irradiation of natural or enriched molybdenum targets. LSA indicates that there is a large amount of Mo present as non-$^{99}$Mo, compared to molybdenum isotopes generated from uranium-based protocols. Therefore, LSA protocols employ different separation techniques. LSA $^{99}$Mo contains a lot of Mo. Larger columns are needed, which leads to larger elution volumes that are undesired because the $^{99m}$Tc product is diluted.

Alternative production routes for $^{99}$Mo are being sought after—using either reactor or accelerator-based production on natural or enriched $^{98}$Mo or $^{100}$Mo targets. These irradiated targets, once dissolved, produce high concentrations of Mo during chemical treatments of the irradiated targets. Furthermore, recovering enriched material is a high priority for cost-effectiveness. Developing a $^{99m}$Tc generator from bulk Mo solutions has proven to be problematic during the R&D of non-uranium-based $^{99}$Mo production.

Current LSA generators have notable problems and challenges, such as large footprints, low Tc recoveries, and complicated operating procedures. Many rely on multiple electronic components that are susceptible to radiation damage.

Generators used for low specific activity $^{99}$Mo include a zirconium "gel-type" system. Other methods utilize bridging agents such as carbon, Ce(IV), lanthanides, or actinides. But adding zirconium or carbon generates Mo—Z or Mo—C polymers. These polymers and additives contaminate the enriched Mo target and require specifically designed purification after the $^{99}$Mo is exhausted.

Complex separation systems, such as computer-driven protocols, have been attempted to facilitate isotope separations. Their complexity requires different personnel (both laboratory and computer) to function. Such complex, electronic systems may not be compatible with radiation-intense chemical processing, such as $^{99}$Mo handling.

A need exists in the art for a system and method for generating $^{99m}$Tc from Mo targets without compromising the purity of the Mo. The system and method should produce $^{99m}$Tc that is devoid of radionuclide and chemical impurities. Ideally, the $^{99m}$Tc would be generated in an inorganic solution such as NaCl. The system and method should also provide good recovery of $^{99m}$Tc from Mo target (e.g., at least 75 percent). A minimal loss of source Mo material is also desired. A generator comprising solely of molybdenum, oxygen, ammonium or alkali earth metal is desired. The molybdenum target material after processing should be in a reusable form that does not require additional extensive purification steps. Finally, the system and method should be presentable as a simple (e.g., turnkey) operation, which does not require the involvement of complex computer systems.

SUMMARY OF THE INVENTION

An object of the invention is to provide a system and method for producing medical isotopes that overcomes many of the drawbacks of the prior art.

Another object of the invention is to provide a system and method for efficiently producing $^{99m}$Tc generator for production channels that use and then reuse costly enriched $^{98}$Mo or $^{100}$Mo. A feature of the invention is that it does not introduce binding additives (e.g. Zr, Ce, K, Na, and C). For clarification, binding additives do not include alkali metal hydroxides. An advantage of the invention is that the purity of the targets, be they $^{100}$Mo, $^{98}$Mo, or natural Mo targets, are maintained utilizing current recycling protocols.

Yet another object of the invention is to simplify the generation of $^{99m}$Tc from non-uranium targets. A feature of the invention is the use of only a parent isotope and a mineral acid and/or alcohol to produce a solid compound that releases medically relevant daughter isotope. Hydroxides, such as alkali metal hydroxide or ammonium hydroxides are used to convert Mo into a molybdate form. An advantage of the invention is that the majority of Mo is removed by precipitation, such that relatively small amounts of Mo remain in solution. This allows the use of smaller guard columns thereby simplifying the prior art LSA generation process. As such, the attractive target material—once exhausted of $^{99}$Mo—maintains its chemical integrity and can be easily recycled for future use.

Still, another object of the invention is to provide a system and method for producing daughter isotopes while maintaining and refurbishing the parent isotope as a feedstock. A feature of the invention is the recycling of the parent isotope after the initial separation of the daughter isotope. An advantage of the invention is that relatively expensive parent feedstock is maintained for further processing into daughter isotope.

Another object of the invention is to provide a system and method to process low specific activity parent isotopes to medically relevant daughter isotopes. A feature of the invention is that despite the need for high elution volumes compared to high specific activity protocols, high yields (e.g. at least 90 percent and typically from 95 to 99 percent) of molybdenum feedstock are maintained. For example, if alcohol such as ethanol (ETOH), propanol, or isopropyl alcohol is used as a precipitating agent, 99 percent of Mo is precipitated out. If mineral acid such as HCL is used, 99 percent may also be achieved if Mo is removed from guard columns after each "milking," as discussed infra. An advantage of the invention is that costs are reduced inasmuch as expensive feedstocks are preserved.

Briefly, the invention provides a method for separating a parent isotope from a daughter isotope, the method comprising supplying irradiated targets; dissolving the irradiated target; treating the dissolved irradiated target to a precipitation step to form a first solid phase of the parent isotope and a first liquid phase of the daughter isotope; eluting the first liquid phase of the daughter isotope with a guard column to capture residual target material that was not precipitated; capturing the eluted first liquid phase of the daughter isotope onto a concentration column; eluting the captured daughter isotope in a first low-volume (e.g. 5 mL or less, and typically between 0.5 and 10 mL), pharmaceutically suitable matrix. Such a low volume pharmaceutically suitable matrix may be physiological saline, wherein saline concentrations are less than 1 percent.

Furthermore, the first solid phase of parent isotope may be dissolved to create a second solid phase of the parent isotope and a second liquid phase of the daughter isotope. This second liquid phase may be further eluted through a guard column to capture further residual parent isotope. The second liquid phase may then be captured onto a concentration column for final elution in another low volume, pharmaceutically presentable matrix, or else combined with the first low volume matrix.

Also provided is a system for separating a daughter isotope from a parent isotope in irradiated targets, the system comprising an alkaline treatment for dissolving metal oxide (e.g., molybdenum trioxide) target; an acid or alcohol treatment to form a first solid phase of the parent isotope and a first liquid phase of the daughter isotope; a guard column to purify the first liquid phase and capture parent isotope that was not precipitated; a concentration column to adsorb the daughter isotope contained in the eluted first liquid phase; and a chemical cocktail to elute the adsorbed daughter isotope in a low-volume, pharmaceutically suitable matrix.

The system also features a re-dissolution utility, whereas residual solid molybdenum generated as a result of working the system is recirculated through the system.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
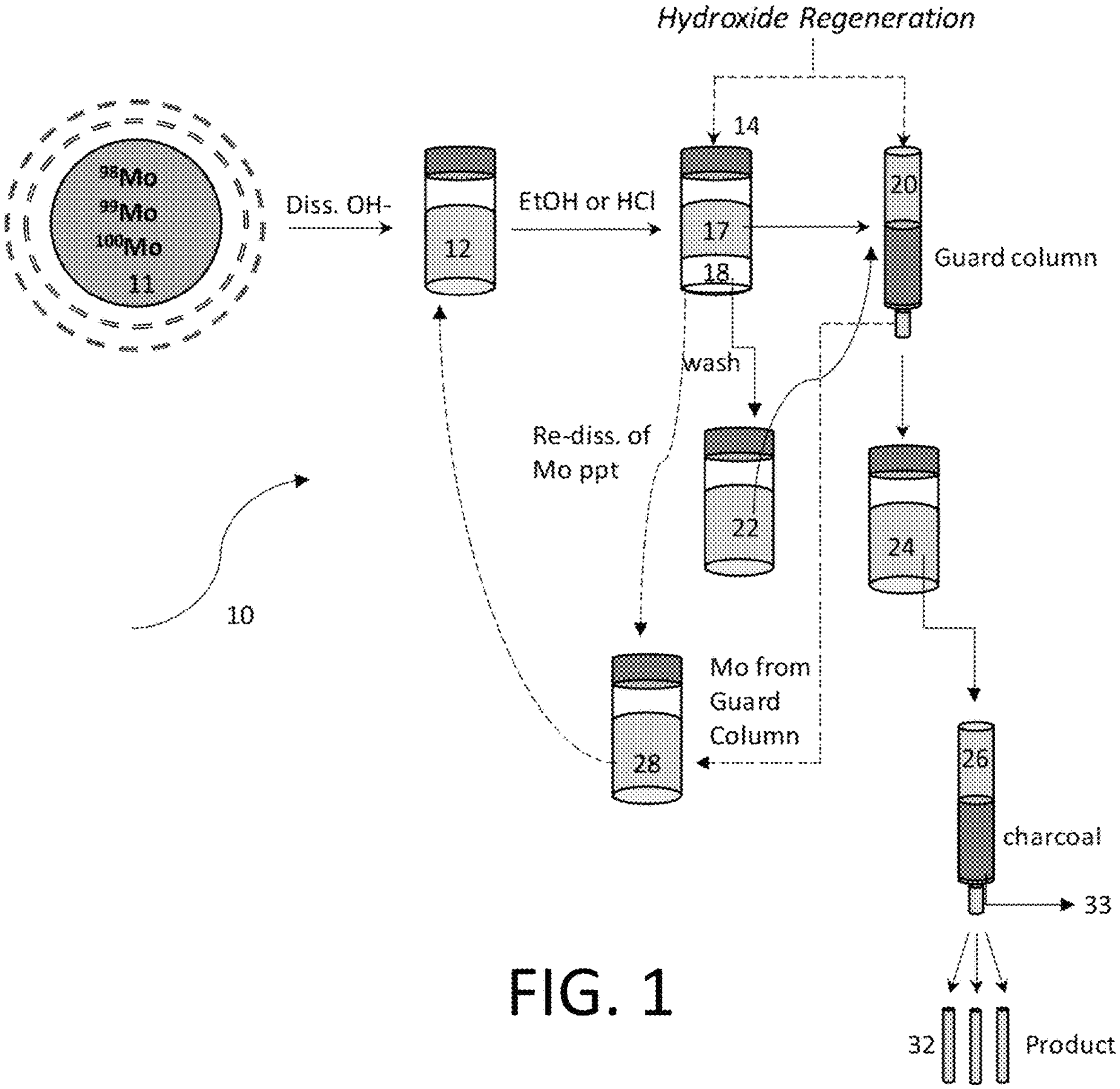
FIG. 1 is a schematic drawing of a system and method for generating isotopes, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

A wet bench system and method are provided to process low activity parent isotopes to medically relevant daughter isotopes. A salient feature of the invention is the preservation of both target feedstock (e.g., molybdenum, tungsten) and their progeny isotopes, namely $^{99m}$Tc and $^{188}$Re, respectively.

While a myriad of parent-daughter isotope pairs may be processed with this invented protocol, for illustrative purposes only, the bulk of this specification will deal with molybdenum-technetium separations and purifications. The parent-daughter isotope chemistry involves the decay of $^{99}$Mo wherein the emission of a beta electron leaves behind an excited nucleus, which returns to its ground state by emitting a gamma photon. Equations 1-2 below shows this physics. Equation 3 shows the direct production of $^{99m}$Tc by cyclotron.
Equation 4 shows the tungsten to rhenium decay.

$$^{98}Mo(n,\gamma)^{99}Mo \xrightarrow[t_{1/2}=66h]{\beta} {}^{99m}Tc \xrightarrow[t_{1/2}=6.1h]{\gamma} {}^{99}Tc \xrightarrow[t_{1/2}=2.1\times10^{5}y]{\beta} {}^{99}Ru \quad \text{Eq. 1}$$

$$^{100}Mo(\gamma,n)^{99}Mo \xrightarrow[t_{1/2}=66h]{\beta} {}^{99m}Tc \xrightarrow[t_{1/2}=6.1h]{\gamma} {}^{99}Tc \xrightarrow[t_{1/2}=2.1\times10^{5}y]{\beta} {}^{99}Ru \quad \text{Eq. 2}$$

$$^{100}Mo(p,2n)^{99m}Tc \xrightarrow[t_{1/2}=6.1h]{\gamma} {}^{99}Tc \xrightarrow[t_{1/2}=2.1\times10^{5}y]{\beta} {}^{99}Ru \quad \text{Eq. 3}$$

$$^{186}W(2n,\gamma)^{188}W \xrightarrow[t_{1/2}=69d]{\beta} {}^{188}Re \xrightarrow[t_{1/2}=17h]{\beta} {}^{188}Os \quad \text{Eq. 4}$$

Irradiated natural or enriched molybdenum target (e.g., $MoO_3$) is initially dissolved in an alkaline solution. If a metal target is used, the target is dissolved using hydrogen peroxide and then converted to molybdate using NaOH, KOH, $NH_4OH$. The use of metal targets is preferred for higher production. Generally, suitable counter-ions include, but are not limited to Na, K, $NH_4$, and combinations thereof. An example of this protocol is where metal Mo target is first dissolved in hydrogen peroxide and converted to molybdate by adding alkali or ammonium hydroxide; the molybdate (such as Molybdenum trioxide ($MoO_3$) target is then dissolved in alkali or ammonium hydroxide.

The invented method and system are based on the observations by the inventors that molybdenum has a high tendency to precipitate in slightly acidic media, particularly with higher concentrations (e.g., from 0.01 M to about 4 M) of molybdenum. Concentrations of ~3.7 M were achieved in ammonium heptamolybdate. Molybdates are found to be insoluble in ethanol (EtOH), and to a certain limit in mineral acid such as hydrochloric acid (HCl).

While $TcO_4^-$ or $ReO_4^-$ do not precipitate under the molybdenum isolating and purification protocol disclosed infra, the instant method and system may be modified to generate rhenium from its parent isotope tungsten. The inventors have found that in the invented protocol, Mo and W display very similar chemistries such that both molybdates and tungstates s are insoluble in ethanol and precipitate at lower pH in acid. Re and Tc have similar chemistries and remain in solution, therefore can be separated from mothers by filtration.

It should be appreciated that molybdenum and its progeny remain in equilibrium prior to their wet bench separation. This makes for an elegant delivery system for both medically relevant molybdenum and technetium compounds. For example, by simply adding ethanol, Mo can be precipitated as solid phase, while Tc stays in the liquid phase. High concentrations (up to at least 3.7 M, and usually 1-2 M) of Mo augment the formation of this precipitate. Any remaining soluble molybdenum can be captured using a conventional inorganic sorbent. Up to about 3.7 molar concentrations of molybdenum may be generated with the wet bench treatment of irradiated targets.

FIG. 1 depicts the invented system, generally designated as numeral 10. First, any irradiated Mo target 11 is transformed into a solution in a dissolving step 12 to create molybdate. A myriad of hydroxides are suitable, including but not limited to sodium hydroxide, ammonium hydroxide, potassium hydroxide, and combinations thereof for conversion to molybdate. Concentrations can range from pH 8 up to pH values associated with solid hydroxide pellets (e.g., pH 15.5).

A filtering step may be employed here to remove cladding, detritus and other solids associated with the solid target feedstock.

The dissolved target is then subjected to a precipitation step. In one embodiment of the invented process, the dissolved target solution is pH adjusted such that the adjustment 14 results in a liquor having a lower pH than what was established in the dissolving step 12. This pH adjusted step generates a liquid phase 17 and a solid phase 18 (e.g. slurry) Mo-containing compound (e.g., $(NH_4, K, Na)_xMo_yO_z$). Such lower pH may range from between 1 and up to 8. Reagents for facilitating precipitation may be a mineral acid such as HCl, $HNO_3$, $H_3PO_4$, HF, and combinations thereof.

Instead of using mineral acid to precipitate dissolve target, alcohol may be employed. For example, ethanol (ETOH), may be utilized to precipitate, but without the aforementioned reduction in pH. Rather ETOH may be used to precipitate Mo due to the latter's very low solubility in ETOH.

In summary, a precipitation step may transform Mo from liquid to solid phase to, therefore, precipitate out of the dissolved target liquor. Or, leveraging the inherently low $K_{sp}$, value of Mo in alcohol will also lead to precipitating of Mo out of the dissolved target liquor. Tungstates also are not soluble in alcohols for this reason.

The liquid phase 17 contains mostly $^{99m}$Tc but could also contain about 5 percent Mo liquid. As such, the first liquid phase of the daughter isotope may be further treated (for example, with acid) to precipitate bulk amounts of the parent isotope.

The solid phase 18 contains mostly molybdenum, including, but not limited to isotopes 92, 94, 95, 96, 97, 98, 99, 100), but also some $^{99m}$Tc. All but 99Mo are naturally occurring. When mineral acid is the precipitation agent, about 20 percent of Tc may remain in solid phase. When ETOH is used, about four percent of Tc may remain in solid phase.

The supernatant 17 thus created is filtered, for example via vacuum draw through a guard column 20 comprised of an inorganic sorbent (e.g., alumina, titania, zirconia, diphonix, di(2-ethylhexyl phosphoric acid), Ln-resin or any organophosphoric acid-based chromatography) to purify the liquid phase having $^{99m}$Tc.

Conversely, the solid 18 generated in the initial precipitation step 14 is washed 22 with dilute acid (e.g., pH of approximately 1-4 HCL) or Ethanol, and the wash solution is also pulled through the guard column 20. Methods for the aforesaid pulling may include negative pressure imposed on the downstream side, or manual pulling wherein an evacuation vial is used to pull the solution inside the column.

The resulting filtrates 24 eluting from the guard column 20 are then contacted with a sorbent 26 to concentrate technetium. At this point, at least 75 percent of $^{99m}$Tc is in solution such that the yield efficiency of the first cycle of the invented process for daughter isotope is at least 75 percent.

Inasmuch as the invented process and system is designed to minimize the generation of excess reagent fluids, alkaline solution 28 (dashed line) is added to any remaining solid Mo— precipitate to yield pH generally the same as what was used in the solubilization step 12. So, a pH of between 8 to 15.5 is targeted to re-establish a solution. The purpose here is to convert solidified Mo from $NH_4KNa_x(Mo_yO_z)$ back into aqueous molybdate solution. While the speciation or form of Mo(VI) changes, its valence state is maintained. So too is that of Tc, wherein its valence is maintained at +7 (e.g., $TcO_4^-$). This forces any remaining Mo precipitate back into solution for subsequent precipitation via recycling to the precipitation step 14.

In brief summation, once the Mo has been removed by precipitation and the guard column, a purified solution of $^{99m}$Tc in pH=4-8 solution is collected. From the charcoal/activated carbon column 26, Tc is eluted, preferably in physiological saline solution. A high pH of the eluted fraction may be maintained and then neutralized to NaCl by mineral acid such as HCl, as discussed in the saline vehicle protocol, infra. Optionally, a micron syringe filter is positioned after the charcoal stage column to capture any insoluble particles passing through the column.

Saline Vehicle

Protocol

Many pharmaceutical applications are facilitated when medical isotopes are administered in physiologically compatible matrices. Saline matrices are among the preferred delivery vehicles, particularly when the concentration of the saline is less than one percent.

The following protocol features the isolation of daughter isotope $^{99m}$Tc from $^{99}$Mo, wherein the final cut of $^{99m}$Tc is supplied in saline. However, other parent-daughter isotope pairs, such as $^{188}$W/$^{188}$Re may also be processed with this sodium matrix protocol.

Reagents and their concentrations and molarities are selected to effectuate the saline matrices. For example, reagents utilized for the first precipitation step 14 of the invented protocol may include Na(K, $NH_4)_2MoO_4$ (which is the dissolved target feedstock liquid), and EtOH/HCl (which is the reagent resulting in the first precipitation 14). The Na(K, $NH_4)MoO_4$ designation indicates that various molybdates could be used, for example sodium-, potassium- or ammonium-molybdate. EtOH/HCl—indicates that reagents are interchangeable, two different ways how to achieve Mo to precipitate, in fact, other acids besides HCl could be used.

The aforementioned first precipitation step generates the solid fraction 18 containing mostly molybdenum, and a liquid fraction containing mostly technetium (i.e., Tc in EtOH/HCl (liquid). It should be appreciated that the Tc liquid fraction will also contain small quantities of liquid Mo, thereby defining a heterogeneous mixture 17.

This heterogeneous mixture 17 (Tc in EtOH/H(Na, K, $NH_4$)Cl (liquid)+small quantities of Mo (liquid) are then mixed with guard column 20 adsorbent (i.e., Alumina solid) to generate Mo—$Al_2O_3$(Alumina-solid)+Tc in EtOH/H(Na, K, $NH_4$)Cl (liquid). Preferably, chloride is added as HCl, NaCl, KCl or $NH_4Cl$ to prevent sorption of Tc on the guard column adsorbent 20.

Figure 3:
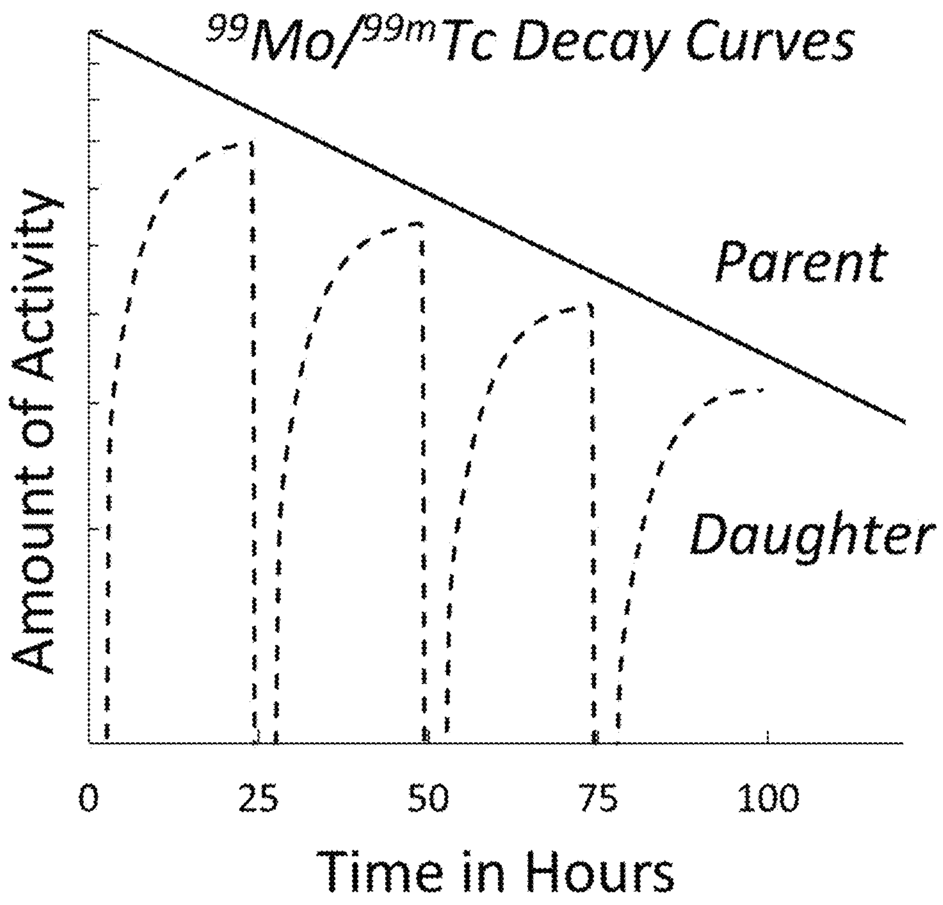
FIG. 3 is a graph that depicts the isotope concentration effects of the invented method for generating isotopes, in accordance with the features of the present invention.

The captured Mo on guard column may then be dissociated to harvest the molybdenum for reprocessing, for example by adding hydroxide 28. This reprocessing feature provides a means to allow multiple reharvestings or "milkings" of the Mo feedstock. FIG. 3 is a graph that depicts the isotope concentration effects of this milking protocol.

At the beginning, Mo and Tc are in equilibrium, so Tc decays with half-life of $^{99}$Mo. After separation, there is still $^{99m}$Tc in the $^{99}$Mo fraction, but not much. So, there is a certain waiting period for $^{99m}$Tc to grow in. Within about 24 hrs $^{99m}$Tc, reaches equilibrium again and is therefore milked again. This repetition is a means for end user pharmaceutical suppliers to harvest Tc product when necessary. The time when Tc is milked again may be different depending on the needs of a specific radio-pharmacy which invested in a turnkey system embodying the invented protocol. A typical generator may be milked 30-50 times, three times a day, for two working weeks.

Surprisingly and unexpectedly, the inventors found that charcoal/activated carbon facilitates the production of pharmaceutically desirable NaCl—$^{99m}$Tc matrix. As such, the Tc in EtOH/H(Na, K, $NH_4$)Cl (liquid) (item 24 in FIG. 1) is contacted with a charcoal column 26 to generate a Tc-charcoal solid fraction 31 and a EtOH/HCl liquid fraction 33.

The Tc-charcoal solid phase is contacted with liquid NaOH to release the Tc from the charcoal. The subsequent Tc—NaOH mixture 32 is then deposited into receiving vials each containing HCl to generate the pharmaceutically friendly NaCl—Tc matrix. That reaction is NaOH+HCl→0.9% NaCl in $H_2O$.

Alternatively, the Tc-charcoal solid complex may be directly contacted with 0.9% NaCl (liquid to generate Tc in 0.9% NaCl (liquid).

The invented method and system regenerates more than 99.8 percent of molybdenum that is processed. Also, more than 90 percent of daughter isotope Tc is recovered. For example, and as illustrated in Table 1 below, when ETOH is used as the initial precipitating reagent, 99.8 percent of molybdenum is recovered.

TABLE 1

Parent and Daughter Isotope Product Recovery with ETOH initial precipitation

| | Mo-99 | Tc-99m | Na |
|---|---|---|---|
| Effluent (80% EtOH) | 0.15% | 89% | 0.27% |
| Wash (100% EtOH) | 0.04% | 7.7% | 0.10% |
| Total | 0.19% | 96.7% | 0.37% |
| Regenerated solution | ~99.8% | — | >99% |

It is noteworthy that these recoveries were effected with only a 5 mL solution volume. As noted supra, suitable volumes may range from 0.1 to 10 mL.

Example 1

One gram of $MoO_3$ was dissolved in approximately 10 mL of 1M $NH_4OH$ to give a final pH of approximately 6.1 The solution was spiked with a $^{99m}$Tc/$^{99}$Mo tracer.

The solution was then acidified with HCl until a white slurry appeared; the pH of this slurry was approximately 1.2. After a 30 minute waiting period, the slurry was filtered by centrifugation where the supernatant was collected and analyzed by γ-spectroscopy. The results showed that approximately 5 percent of the $^{99}$Mo passed through the precipitation step. The supernatant was contacted with 1-gram of inorganic sorbent, equilibrated for 5 min., filtered, and analyzed. The resulting spectrum showing only purified $^{99m}$Tc is shown in FIG. 2.

Figure 2:
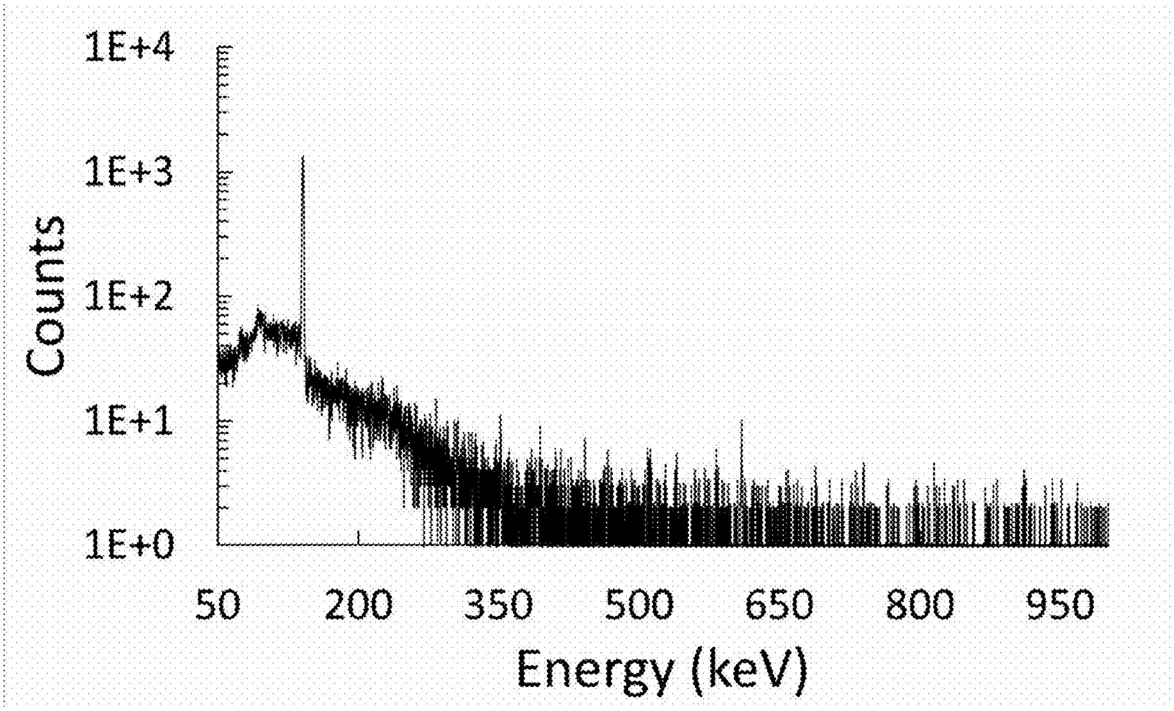
FIG. 2 is a spectrum of purified daughter isotope, in accordance with features of the present invention

FIG. 2 shows that there is no evidence of $^{99}$Mo in the purified spectrum, indicated that complete removal of Mo was achieved by the secondary resin 26.

Example 2

A 1M solution of Mo was prepared from $Na_2MoO_4 \cdot 2H_2O$ and dissolved into 5 mL of $H_2O$. The solution was spiked with a $^{99m}$Tc/$^{99}$Mo tracer.

The solution was combined with 25 mL of 100% EtOH. After brief mixing, Mo precipitates as an alkaline molybdenum salt (e.g., a sodium molybdenum salt while Tc remains in solution. The solution was filtered over a glass frit and washed with 100% EtOH to collect remaining Tc. Mo precipitate was then dissolved into 5 mL of $H_2O$, returning it to its original state. Mo and Tc recoveries were analyzed by γ spectroscopy and Na concentrations were measured by ICP-MS. The results are presented in Table 1.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for separating a parent isotope from a daughter isotope, the method comprising:

a) supplying irradiated target material;

b) dissolving the irradiated target material to form an aqueous solution of molybdate salt;

c) treating the dissolved irradiated target with ethanol to form a first solid phase of the parent isotope and a first liquid phase of the daughter isotope;

d) filtering the first liquid phase of the daughter isotope with a guard column to capture residual target material that was not precipitated;

e) capturing the daughter isotope contained in the filtered first liquid phase onto a concentration column;

f) eluting the captured daughter isotope in a low-volume, pharmaceutically suitable matrix;

g) dissolving the first solid phase of parent isotope in water, and;

h) repeating steps c-g wherein the parent isotope is an element selected from the group consisting of molybdenum, tungsten, and combinations thereof and daughter isotope is an element selected from the group consisting of technetium, rhenium, and combinations thereof.

2. The method as recited in claim 1 wherein the first liquid phase of the daughter isotope is repeatedly treated to precipitate bulk amounts of the parent isotope, wherein no pH adjustment is required prior to the precipitation step.

3. The method as recited in claim 1 wherein the first liquid phase of the daughter isotope represents more than 75 percent yield of total daughter isotope present.

4. The method as recited in claim 1 wherein the parent isotope is molybdenum, and the daughter isotope is technetium, and wherein 99 percent of the molybdenum present is precipitated.

5. The method as recited in claim 4 wherein the first solid phase of the parent isotope is solubilized to yield additional liquid phase daughter isotope for subsequent harvesting.

6. The method as recited in claim 4 wherein the yield of the daughter isotope is between 75 percent and 99 percent.

7. The method as recited in claim 1 wherein the step of eluting the first liquid phase of the daughter isotope comprises combining the first liquid phase with a chloride to create a mixture and contacting the mixture with a sorbent to create a purified fraction of the daughter isotope.

8. The method as recited in claim 7 wherein the purified fraction of the daughter isotope resides in a saline solution.

9. The method as recited in claim 8 wherein the saline solution is less than one percent concentrated.

10. The method as recited in claim 1 further comprising resolubilizing the target material residing in steps c and d with hydroxide.

11. The method as recited in claim 5 wherein no pH adjustment is required prior to the subsequent reharvesting of the liquid phase daughter isotope.

12. The method as recited in claim 1 wherein the low volume ranges from between 0.1 ml and 10 ml.

13. The method as recited in claim 7 wherein the purified daughter isotope exhibits 1E+0 to 1E+4 counts ranging from between 50 and 950 keV.

* * * * *